(12) United States Patent
Qiu et al.

(10) Patent No.: US 7,754,276 B2
(45) Date of Patent: Jul. 13, 2010

(54) PROCESS FOR MANUFACTURING LOW ESR CONDUCTIVE POLYMER BASED SOLID ELECTROLYTIC CAPACITORS

(75) Inventors: Yongjian Qiu, Greenville, SC (US);
Qingping Chen, Simpsonville, SC (US);
Philip M. Lessner, Newberry, SC (US);
Randy S. Hahn, Simpsonville, SC (US);
Cynthia L. Prince, Laurens, SC (US);
Keith R. Brenneman, Simpsonville, SC (US)

(73) Assignee: KEMET Electronics Corporation, Greenville, SC (US)

( * ) Notice: Subject to any disclaimer, the term of this patent is extended or adjusted under 35 U.S.C. 154(b) by 574 days.

(21) Appl. No.: 11/787,378

(22) Filed: Apr. 16, 2007

(65) Prior Publication Data

US 2008/0250620 A1    Oct. 16, 2008

(51) Int. Cl.
*B05D 5/12*    (2006.01)
*B05D 1/18*    (2006.01)

(52) U.S. Cl. .................. 427/79; 427/80; 427/318; 427/337; 427/430.1; 427/435

(58) Field of Classification Search .............. None
See application file for complete search history.

(56) References Cited

U.S. PATENT DOCUMENTS 6,110,379 A * 8/2000 Overton et al. ............... 210/695
6,334,966 B1 * 1/2002 Hahn et al. .................. 252/500
7,479,166 B2   1/2009 Ito ............................ 29/25.03

FOREIGN PATENT DOCUMENTS

JP    11121279 A  *  4/1999
JP    2001-244151    11/2009

OTHER PUBLICATIONS

Machine translation of JP 11121279 to Takamatsu obtained Feb. 29, 2009 from <http://dossier1.ipdl.inpit.go.jp/AIPN/odse_top_dn.ipdl?N0000=7400>.*
Sotoh et al., Structure and properties of polypyrrole synthesis under air and oxygen-free conditions, Synthetic Materials 84 (1997) 167-168.*

* cited by examiner

*Primary Examiner*—Timothy H Meeks
*Assistant Examiner*—Collette Ripple
(74) *Attorney, Agent, or Firm*—Joseph T. Guy; Nexsen Pruet, LLC

(57) ABSTRACT

A method for maintaining quality of monomer during a coating process for intrinsically conductive polymer which suppresses unwanted by-products. A neutralization process using a base or anion exchange resin is used batch-wise or continuous.

42 Claims, 3 Drawing Sheets

PROCESS FOR MANUFACTURING LOW ESR CONDUCTIVE POLYMER BASED SOLID ELECTROLYTIC CAPACITORS

FIELD OF THE INVENTION

This invention relates to solid electrolytic capacitors having cathodes formed with intrinsically conductive polymers. More specifically, this invention relates to methods for the treatment of monomers of conductive polymers to extend pot life and improve polymer coating performance.

BACKGROUND

Solid electrolytic capacitors with conductive polymers as the cathode materials have been widely used in the electronics industry due to their advantageously low equivalent series resistance (ESR) and "non-burning/non-ignition" failure mode. Various types of conductive polymers including polypyrrole, polyaniline, and poly(3,4-ethyldioxythiophene) (PEDOT) are applied to electrolytic capacitors as a cathode material when valve metals such as Ta, Al, and Nb as well as conductive oxides such as ceramic NbO, are used as the anode.

In a manufacturing process to produce conductive polymer based valve metal capacitors, Ta powder, for example, is mechanically pressed to form Ta metal pellets, which are subsequently sintered at high temperature under vacuum. The sintered pellets are anodized in an electrolyte solution to form a dielectric layer ($Ta_2O_5$) on the anode surface. Following that, multiple layers of a conductive polymer, such as poly 3,4-ethylenedioxythiophene (PEDOT), are laid down by a multiple dipping polymerization process. During the polymerization process, an oxidant solution, such as iron (III) p-toluenensulfonate solution in a solvent, is first applied onto the anodes. It is then followed by the application of a liquid monomer or monomer solution as disclosed by D Wheeler, et al. in U.S. Pat. No. 6,136,176 and by R. Hahn, et al., in U.S. Pat. No. 6,334,966. A polymer layer will form on the surface of the dielectric as the result of polymerization reaction. The polymer coated anodes are washed to remove excessive reactants and byproducts. This polymerization step may be repeated multiple times to achieve a desired thickness of the conductive polymer layer. The conductive polymer layer should be reasonably robust in order to protect the anodes from potential mechanical damages in the post-polymerization process and from direct contact with carbon and silver layers, which are subsequently applied to provide connection between conductive polymer cathode and the outside circuitry. The carbon and silver coated anodes are then encapsulated, aged and tested to complete the manufacturing process. An illustrative structure of a conductive polymer based capacitor is illustrated in FIG. 1.

In FIG. 1, the capacitor has an anode, 1, such as a tantalum anode. An anode wire, 2, such as a tantalum wire extends from the anode and is in electrical contact with a leadframe, 8, such as by a weld, 3. A dielectric is on the surface of the anode. Coated on the surface of the dielectric is a conductive polymer, 5. A carbon coating, 4, and silver paint, 7, provide adhesion and conduction to a cathode lead preferably through a silver adhesive, 10. A solderable coating, 9, on the lead frame is provided to increase adhesion during mounting to a substrate or the like. A washer, 6, protects the anode wire during layer buildup.

The ESR characteristics of a conductive polymer based capacitor are heavily influenced by the quality of conductive polymer. It is highly desirable that the structure of the conductive polymer has a high degree of electron delocalization, or conjugation, as in an alternate single and double bond structure or in an aromatic, which provides the foundation for achieving high conductivity. Also, a dense, robust polymer layer is essential for low ESR capacitors which are subjected to the thermal mechanical stresses when they are mounted onto a circuit board via surface mounting. ESR varies with the size of the anode in the finished capacitor. For the purposes of the present invention the ESR is defined based on a V-case anode with dimensions of 4.9 mm×3.25 mm×1.7 mm, wherein low ESR is less defined to be less than about 50 milliohms, preferably less than about 25 milliohms, and most preferably less than about 10 milliohms. A polymerization process that consistently produces such quality of polymer is highly desirable.

It is known that the formation of conductive polymer follows an oxidative coupling mechanism. The monomers are oxidized by oxidants such as ferric salts to form charged radicals, which then couple with each other to become dimers. These dimers will be further oxidized to form higher molecular segments via similar steps resulting in the formation of polymers. An example of the polymer, PEDOT, is provided in FIG. 2.

Through diligent research the present inventors have determined elevated levels of non-conjugated dihydrothiphene in the monomer bath can lead to significant degradation in the performance characteristics in the finished product. The degradation is realized in an increase in ESR of the final capacitor. Previously, the mechanism for this degradation was not accurately characterized. In an effort to insure adequate capacitor properties it was the standard practice of skilled artisans to frequently replace the monomer solution. This leads to excessive waste and inefficient use of human resources.

Through diligent research the present inventors have determined the mechanism of degradation and have provided an improvement in the monomer solution, resulting polymer film, and a surprising improvement in the resulting capacitor by mitigating the effects of the degradation mechanism.

BRIEF SUMMARY OF THE INVENTION

It is an object of the invention to provide a process that can consistently produce conductive polymer based capacitors with low ESR.

It is another object of the invention to provide a method for effectively controlling the polymerization process to produce low ESR conductive polymer based capacitors.

It is also an object of the invention to describe a method that can be used to control the quality of reactant (monomer) in the polymerization reaction.

A particular object of the present invention is to provide an improved monomer solution wherein the degradation is mitigated thereby leading to an improved polymer upon treatment with an oxidizer.

A special feature of the present invention is the ability to provide a capacitor with improved, lower, ESR and the capacitor can be provided at a lower cost, with increased manufacturing efficiency and with higher consistency in the measured ESR across large numbers of manufactured capacitors.

These and other advantages, as will be realized, are provided in a monomer solution with a monomer of an intrinsically conductive polymer treated to maintain a desired pH level.

Yet another advantage is provided in a method for forming a capacitor. The method includes forming anode of a valve metal. A dielectric is formed on the anode. An intrinsically conductive polymer is formed on the dielectric by coating the dielectric with a monomer solution comprising a monomer of an intrinsically conductive polymer and at least one alkaline material. The monomer is then polymerized.

Yet another advantage is provided in a method for forming a multiplicity of capacitors. The method includes forming anodes of a valve metal or valve metal oxide; forming a dielectric on each anode of the anodes; forming a monomer solution comprising a monomer of an intrinsically conducting polymer; treating the monomer solution with at least one of an alkaline material and an ion exchange material to achieve a first pH of at least 4 to no more than 7; forming an intrinsically conductive polymer on each said dielectric by coating the dielectric with the monomer solution; and polymerizing the monomer.

DETAILED DESCRIPTION OF THE INVENTION

Provided herein is an improved monomer solution which is protected from degradation and therefore yields greatly a greatly improved polymer with higher conductivity.

Also provided herein is an improved capacitor and the method for making the improved capacitor utilizing improved monomer. More particularly, provided herein is a method that allows the production of such a capacitor with consistency.

High polymer conductivity, preferably up to about 1000 S/cm, is essential for low ESR applications of conductive polymer capacitors. Extensive efforts have been made to achieve further ESR reduction, including the application of various types of oxidants and dopants, the incorporation of various materials to "stabilize" the conductive polymer, and other ongoing process optimizations. It has been found that higher conductivity of the polymer can be achieved using monomer with pH above 4. Moreover, the consistency of the monomer solution and resulting conductive polymer film can be improved by maintaining a pH above 4.

Figure 3:
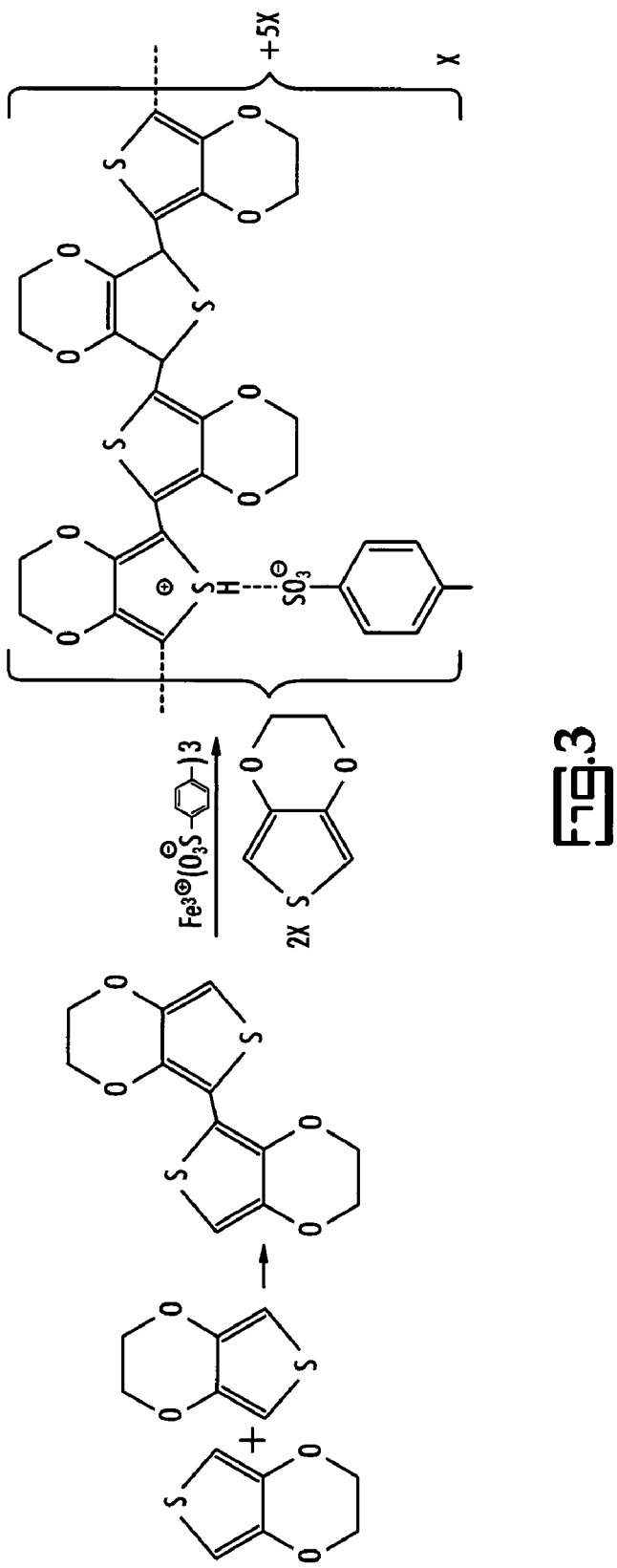
FIG. 3 illustrates the polymerization of 3,4-ethylenedioxythiophene in the presence of a protic (Brønsted) acid.

It was found that the low ESR advantage of using high purity grade monomer diminishes over time, suggesting that the high purity monomer ages during use. Analysis of the "aged" monomer shows a decreased pH of the monomer solution, apparently as the result of acid accumulation in the monomer from the multiple dipping processes of the anode. The decrease in pH indicates that there is a buildup of protic acids which promote side-reaction polymerization products as shown in FIG. 3. Of particular concern is the incorporation of unconjugated rings in the side reaction polymerization. Unconjugated rings disrupt the conductive path for electrons and therefore lower the conductivity of the polymer chain. This new understanding of the mechanism of incorporation of unconjugated rings now allows for a correlation of the underlying mechanism of degradation and the ESR variability in finished capacitors. The correlation was not previously resolved and therefore there was no proposed mechanism for resolving the primary problem caused thereby.

As the measurement of pH in non-aqueous organic media is not straightforward, a method for accomplishing this measurement is herein described. Equal amounts of water-insoluble monomer solution and deionized water are placed in a centrifuge tube and shaken vigorously for 2 minutes. This mixture is then centrifuged for 5 minutes and the aqueous layer extracted. The pH of the aqueous extract is measured as a surrogate for the pH of the monomer solution at different stages of use. The data are summarized in Table 1. Deionized water was measured using the same procedure as a control and is also listed in Table 1.

TABLE 1 pH values obtained for comparative compositions

| Sample Description | pH using $H_2O$ extraction |
| --- | --- |
| Monomer as received | pH 4.71 |
| Monomer after use | pH 3.76-3.85 |
| Used monomer after distillation | pH 5.40 |
| Deionized Water as Control | pH 6.89 |

Figure 1:
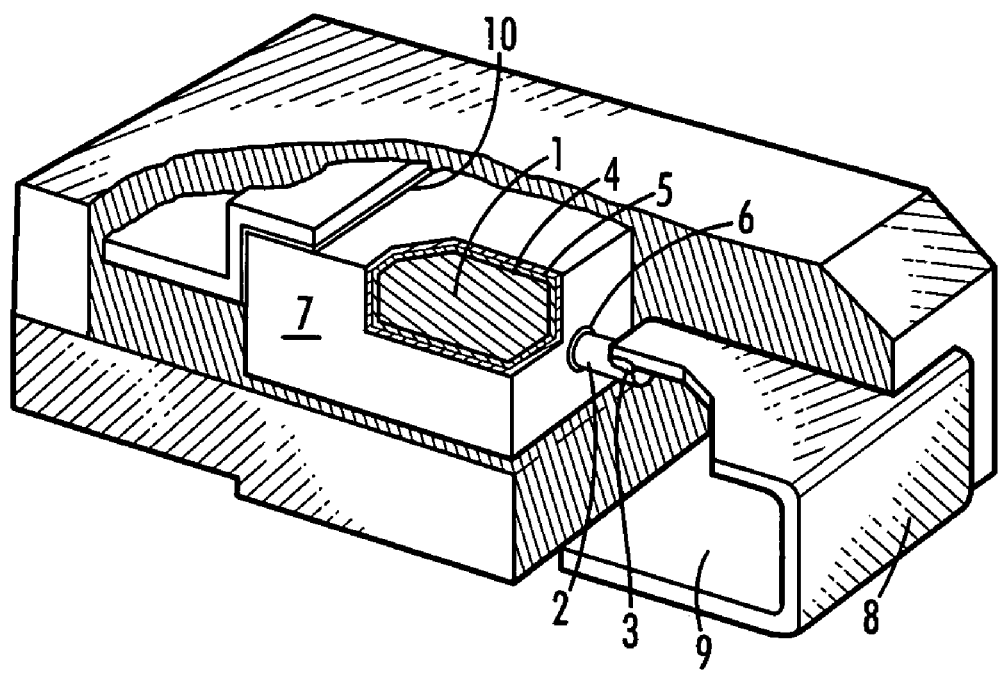
FIG. 1 illustrates the structure of a solid electrolytic capacitor having an intrinsically conductive polymer cathode.
Figure 2:
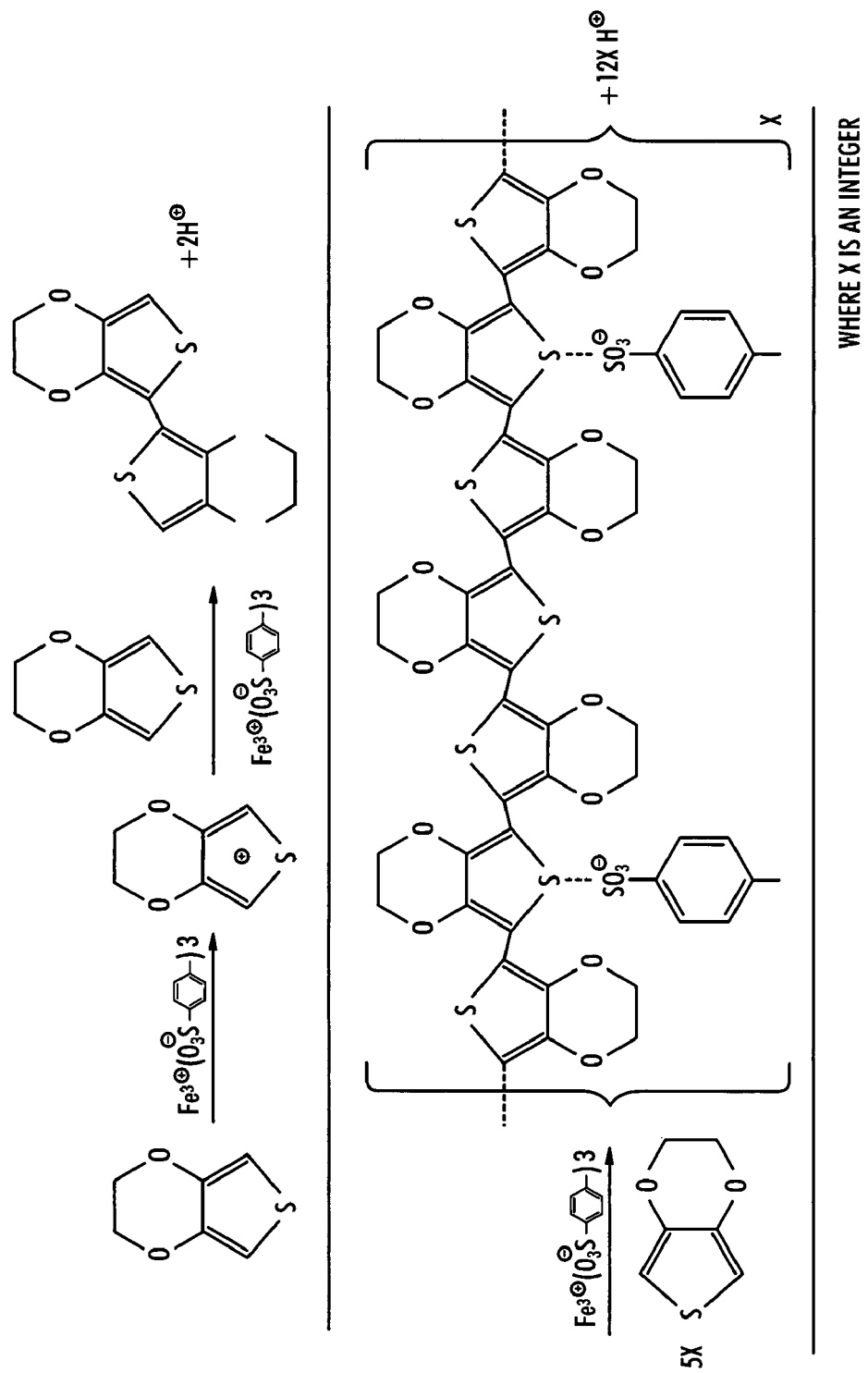
FIG. 2 illustrates the steps in the polymerization of 3,4-ethylenedioxythiophene in the presence of Fe (III) p-toluenesulfonate

The presence of acid in the monomer tends to initiate "acid catalyzed" side reactions, which directly compete with the desired polymerization reaction. The suggested steps are illustrated in FIG. 3. The acid catalyzed reactions yield non-conjugated dihydrothiophene molecules which lead to poor conductivity, while the oxidative polymerization as shown in FIG. 2, produces highly conductive material with high degrees of conjugation. The ESR of conductive polymer capacitors are negatively affected by the presence of acid catalyzed reaction products due to the increased resistance of the conductive polymer matrix (lower degree of conjugation).

In order to produce highly conductive polymer, the acid catalyzed reactions should be prevented from occurring, or at least be suppressed to minimize its negative impact. If not suppressed, the pH of the solution could continue to drop to pH 3 and below due to further acid accumulation. Efforts were made to remove the accumulated acid content from monomer solution. As stated, pH is an indicator of the acidity of the solution, and should be controlled in the pH range from about 4 to 7, more preferably from about 4 to 6, and most preferably from about 4.5 to 5.5.

It has been found that neutralizing the acid with alkaline materials in the liquid monomer solution can be effective to control the acid catalyzed side reactions, thereby preventing the fresh monomer from degradation. The preferred alkaline materials include metallic oxides, metal hydroxides, organic bases, and basic organic salts. The examples include, but are not limited to alkali metal oxides and hydroxides, alkaline earth metal oxides and hydroxides, ferric hydroxide, organic amines such as dimethyl amine and diethyl amine, alkanolamines such as diethanol amine, aminoalcohols such as 2-amino-2-methyl-1-propanol (trade name AMP-95 from Angus Chemicals, Buffalo Grove, Ill.).

It was found that distillation of aged monomer could minimize the presence of unwanted resultants from acid catalyzed reactions, protecting the monomer from degradation. This technique, though suitable in a batch process, does not provide a practical solution in a continuous or near-continuous manufacturing environment.

Monomer 3,4-ethylenedioxythipene (EDOT) is a liquid at room temperature and readily distilled under vacuum to produce a clean-cut fraction of very high purity. Impurities such as water, solvent and other contaminants have been found to distill off well below the boiling point of EDOT so that at the end of the distillation process a pure monomer is available. A fresh, regenerated solution of non-aqueous monomer may be reconstituted for the coating process.

It was also found that passing the liquid monomer through a column of basic anion exchange resins or membranes such as commercial products Lewatit series from Sybron Chemicals Inc. (Birmingham, N.J.), and Dowex series from the Dow Chemical Company (Midland, Mich.), was effective to prevent the monomer from degradation.

In a particularly preferred embodiment a continuous manufacturing process is provided wherein the monomer solution is continuously, or periodically, passed from the dipping container, through a purification device, such as a basic anion exchange column and returned to the dipping container. This continually removes acid built up during the polymerization process and eliminates the need for replacing the monomer solution. In a particularly preferred embodiment the pH of the purified monomer solution is determined and subsequently monitored. Once a predetermined decrease from the initial pH is reached, say a pH change of 0.5, the solution is circulated through a purification cycle. The frequency of the test and purification cycle is dependent on the number of capacitors being manufactured over a period of time.

The primary culprits in the acidification of the monomer solution are believed to be acid accumulation from the oxidizer or from polymerization reaction by-products. Repetitive dipping steps into the monomer or monomer solution cause the increased acidity of the system. One way of removing these acidic species is through precipitation at reduced temperatures followed by filtration of the precipitates. Other methods of treating the monomer solution to remove the acidic material comprise at least one of distillation and recrystallization. Evidence of the buildup of both wanted and unwanted products from the "aging" of monomer can be found via gas chromatography measurements. Using 3,4-ethylenedioxythiophene as an example, the peaks for the monomer, non-conjugated dimer, and conjugated dimer are distinguishable. It is observed over time that the non-conjugated peak (dihydrothiophene) grows in intensity during usage. It has been found that the content of non-conjugated dihydrothiophene in the monomer solution should be controlled to under 10 wt %, more preferably under 5 wt % and most preferably under 2 wt %.

The terms aniline, polypyrrole and thiophene when used herein to refer to the monomer or a polymer thereof refers to unsubstituted or substituted compounds or derivatives equally unless a specific compound is being referred to specifically.

Comparative Example

A bar of 470 μF 4V rated tantalum anodes with a size of 4.90 mm×3.25 mm×1.70 mm was dipped into a solution of Fe (III) p-toluenesulfonate (oxidant), dried, and subsequently dipped into fresh 3,4-ethylenedioxythiophene (monomer). The anodes were washed to remove excess monomer and byproducts of the reactions after polymerization which formed a thin layer of conductive polymer (PEDOT) on the dielectric surface of the anodes. The anodes were then reformed, i.e., subjected to a DC voltage in a diluted phosphoric acid solution to repair any damage to the dielectric and therefore, reducing the DC leakage. This dipping-reforming process cycle was repeated until a thick polymer layer was formed. Carbon and silver coatings were applied onto the anodes by conventional process and ESR of the capacitors was measured at 100 KHz. The test result is listed in Table 2.

Example 1

A bar of 470 μF 4V rated tantalum anodes, with a size of 4.90 mm×3.25 mm×1.70 mm, was dipped into a solution of iron (III) p-toluenesulfonate (oxidant), dried, and subsequently dipped into a solution of 3,4-ethylenedioxythiophene (monomer) with 5 wt % of p-toluenesulfonic acid. The anodes were washed to remove excess monomer and by-products of the reactions after the completion of polymerization which formed a thin layer of conductive polymer (PEDOT) on the dielectric of the anodes. The anodes were then subjected to a DC voltage, or reformed, in a diluted phosphoric acid solution to reduce DC leakage. This dipping-reforming process cycle was repeated until a thick polymer layer was formed. Carbon and silver coatings were applied onto the anodes. ESR of the capacitors was measured in the same way as described in the comparative example. The test result is listed in Table 2.

Example 2

A bar of 470 μF 4V rated tantalum anodes, with a size of 4.90 mm×3.25 mm×1.70 mm, was dipped into a solution of iron (III) p-toluenesulfonate (oxidant), dried, and subsequently dipped into a solution of 3,4-ethylenedioxythiophene (monomer) with 5 wt % of p-toluenesulfonic acid, which was treated with $Ca(OH)_2$ overnight and filtered. The anodes were washed to remove excess monomer and by-products of the reactions after the completion of polymerization, which formed a thin layer of conductive polymer (PEDOT) on the dielectric surface of the anodes. The anodes were then subjected to a DC voltage, or reformed, in a diluted phosphoric acid solution to reduce DC leakage. This dipping-reforming process cycle was repeated until a thick polymer layer was formed. Carbon and silver coatings were applied onto the anodes. ESR of the capacitors was measured in the same way as described in the comparative example. The test result is listed in Table 2.

Example 3

A bar of 470 μF 4V rated tantalum anodes, with a size of 4.90 mm×3.25 mm×1.70 mm, was dipped into a solution of iron (III) p-toluenesulfonate (oxidant), dried, and subsequently dipped into a solution of monomer with 5 wt % of p-toluenesulfonic acid, which was treated with dry anion exchange resin (Lewatit MP 62, Sybron Chemicals, Birmingham, N.J.) overnight and filtered. The anodes were washed to remove excess monomer and byproducts of the reactions after the completion of polymerization, which formed a thin layer of conductive polymer (PEDOT) on the dielectric of the anodes. The anodes were then subjected to a DC voltage, or reformed, in a diluted phosphoric acid solution to reduce DC leakage. This dipping-reforming process cycle was repeated until a thick polymer layer was formed. Carbon and silver coatings were applied onto the anodes. ESR of the capacitors was measured in the same way as described in the comparative example. The test result is listed in Table 2.

TABLE 2

Impact of monomer quality on ESR*

| | ESR, mΩ |
|---|---|
| Comparative Example | 15.7 |
| Example 1 | 45.3 |

TABLE 2-continued

Impact of monomer quality on ESR*

| | ESR, mΩ |
|---|---|
| Example 2 | 15.8 |
| Example 3 | 16.3 |

*ESR was measured at 100 KHz.

It is evident from data listed in Table 2 that the presence of acid in monomer significantly degrades the ESR performance of the capacitors. Such ESR degradation can be avoided or at least minimized by treating the acid-effected monomer with alkaline materials or basic anion exchange resins.

The invention has been described in terms of examples which are non-limiting. Modifications apparent to persons skilled in the art are subsumed within the scope of this invention as claimed.

INDUSTRIAL UTILITY

This invention is useful for improving the quality of capacitors which are used throughout the electronics industry.

The invention claimed is:

1. A method for forming a capacitor comprising:
   forming an anode of a valve metal or conductive oxide of a valve metal;
   forming a dielectric on said anode;
   charging a receptacle with a monomer solution comprising a monomer of an intrinsically conductive polymer;
   coating said dielectric with a portion of said monomer solution thereby forming a coating of said monomer solution on said dielectric and a used monomer solution;
   chemically polymerizing said portion of said monomer solution on said dielectric by reacting said monomer with an oxidizer; and
   treating said used monomer solution to remove pH decreasing contaminants.

2. The method for forming a capacitor of claim 1 comprising dipping said anode in said oxidizer.

3. The method for forming a capacitor of claim 2 wherein said dipping is before said coating said dielectric by said monomer solution.

4. The method for forming a capacitor of claim 1 wherein said monomer solution is non-aqueous.

5. The method for forming a capacitor of claim 1 wherein said monomer of an intrinsically conductive polymer comprises at least one monomer of a polymer selected from polyaniline, polypyrrole and polythiophene.

6. The method for forming a capacitor of claim 5 wherein said monomer of an intrinsically conductive polymer comprises a monomer of polythiophene.

7. The method for forming a capacitor of claim 6 wherein said monomer of an intrinsically conductive polymer consists essentially of said monomer of polythiophene.

8. The method for forming a capacitor of claim 1 wherein said monomer solution has a pH of at least 4 to no more than 7.

9. The method for forming a capacitor of claim 8 wherein said monomer solution has a pH of at least 4 to no more than 6.

10. The method for forming a capacitor of claim 9 wherein said monomer solution has a pH of at least 4.5 to no more than 5.5.

11. The method for forming a capacitor of claim 1 wherein said treating is selected from adding an alkaline material to said used monomer solution or passing said used monomer through an ion exchange column.

12. A method for forming a capacitor of claim 11 wherein said alkaline material comprises at least one material selected from the group consisting of metallic oxides, metal hydroxides, alkali metal oxides, alkali metal hydroxides, alkaline earth metal oxides, alkaline earth metal hydroxides, organic amines, and organic amine alcohols.

13. The method for forming a capacitor of claim 11 further comprising removing said alkaline material from said used monomer solution.

14. The method for forming a capacitor of claim 11 wherein said ion exchange column comprises a resin.

15. The method for forming a capacitor of claim 11 wherein said passing said used monomer through an ion exchange column is continuous during said forming a capacitor.

16. The method for forming a capacitor of claim 11 wherein said ion exchange column comprises a membrane.

17. A method for forming a multiplicity of capacitors comprising:
   forming anodes of a valve metal;
   forming a dielectric on each anode of said anodes;
   forming a monomer solution comprising a monomer of an intrinsically conducting polymer;
   treating said monomer solution with at least one of an alkaline material and an ion exchange material to achieve a first pH of at least 4 to no more than 7;
   forming an intrinsically conductive polymer on each said dielectric by coating said dielectric with said monomer solution; and
   chemically polymerizing said monomer by reacting said monomer with an oxidizer.

18. The method for forming a capacitor of claim 17 wherein said monomer solution is non-aqueous.

19. The method for forming a capacitor of claim 17 wherein said monomer of an intrinsically conductive polymer comprises at least one monomer of a polymer selected from polyaniline, polypyrrole and polythiophene.

20. The method for forming a capacitor of claim 19 wherein said monomer of an intrinsically conductive polymer comprises a monomer of polythiophene.

21. The method for forming a capacitor of claim 20 wherein said monomer of an intrinsically conductive polymer consist essentially of said monomer of polythiophene.

22. The method for forming a capacitor of claim 17 wherein said monomer solution has a pH of at least 4 to no more than 7.

23. The method for forming a capacitor of claim 22 wherein said monomer solution has a pH of at least 4 to no more than 6.

24. The method for forming a capacitor of claim 23 wherein said monomer solution has a pH of at least 4.5 to no more than 5.5.

25. A method for forming a capacitor of claim 17 wherein said alkaline material comprises at least one material selected from the group consisting of metallic oxides, metal hydroxides, alkali metal oxides, alkali metal hydroxides, alkaline earth metal oxides, alkaline earth metal hydroxides, organic amines, and organic amine alcohols.

26. The method for forming a capacitor of claim 17 further comprising measuring a second pH of said monomer solution and treating said monomer solution when said second pH is a predetermined amount below said first pH.

27. The method for forming a capacitor of claim 26 wherein said predetermined amount is 0.5.

28. The method for forming a capacitor of claim 26 wherein said treating said monomer solution comprises passing said monomer solution through an ion exchange column.

29. The method for forming a capacitor of claim 17 wherein said treating said monomer solution comprises passing said monomer solution through an ion exchange column.

30. The method for forming a capacitor of claim 29 wherein said treating said monomer solution comprises passing said monomer solution through an ion exchange column is a continuous process during said forming of a capacitor.

31. The method for forming a capacitor of claim 29 wherein said ion exchange column comprises a resin.

32. The method for forming a capacitor of claim 29 wherein said ion exchange column comprises a membrane.

33. The method for forming a capacitor of claim 17 wherein each capacitor of said capacitors has an ESR of less than 50 milliohms.

34. The method for forming a capacitor of claim 33 wherein each capacitor of said capacitors has an ESR of less than 20 milliohms.

35. The method for forming a capacitor of claim 34 wherein each capacitor of said capacitors has an ESR of less than 10 milliohms.

36. The method for forming a capacitor of claim 26 wherein said treating of said monomer solution comprises at least one of distillation and recrystallization.

37. The method for forming a capacitor of claim 17 wherein said treating said monomer solution is after said forming an intrinsically conductive polymer.

38. A method for forming a capacitor comprising:
forming an anode of a valve metal;
forming a dielectric on said anode;
charging a receptacle with a monomer solution comprising a monomer of an intrinsically conductive polymer;
coating said dielectric with a portion of said monomer solution thereby forming a coated dielectric and a used monomer solution;
chemically polymerizing said monomer of said portion of said monomer solution on said dielectric by reacting said monomer with an oxidizer; and
treating said used monomer solution to form regenerated monomer solution wherein said regenerated monomer solution has a higher pH than said used monomer solution.

39. A method for forming a capacitor comprising:
forming an anode of a valve metal;
forming a dielectric on said anode;
charging a first receptacle with a solution comprising an oxidant;
charging a second receptacle with a monomer solution comprising a monomer of an intrinsically conductive polymer;
dipping said anode into said first receptacle and removing from said first receptacle thereby forming a dielectric coated with said oxidant;
dipping said anode into said second receptacle and removing thereby forming a contaminated monomer solution;
treating said contaminated monomer solution to remove pH decreasing contaminants left as a result of said dipping or formed as a result of reaction within said contaminated monomer solution.

40. The method for forming a capacitor of claim 39 wherein said reaction byproduct is a proton.

41. The method for forming a capacitor of claim 40 wherein said removal is a result of complexing of said proton with hydroxide.

42. A method for forming a capacitor comprising:
forming an anode of a valve metal;
forming a dielectric on said anode;
charging a receptacle with a monomer solution comprising a monomer of an intrinsically conductive polymer;
coating said dielectric with a portion of said monomer solution thereby forming a coating of said monomer solution on said dielectric and a used monomer solution;
chemically polymerizing said monomer on said dielectric by reacting said monomer with an oxidizer; and
treating said used monomer solution to remove pH decreasing contaminants left as a result of said coating or formed as a result of reaction within said used monomer solution.

* * * * *